Patented Aug. 25, 1925.

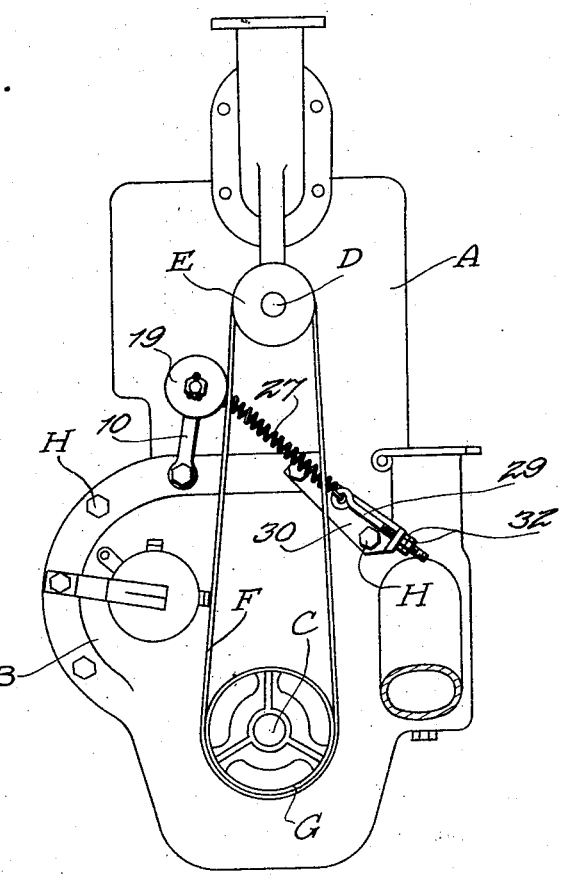
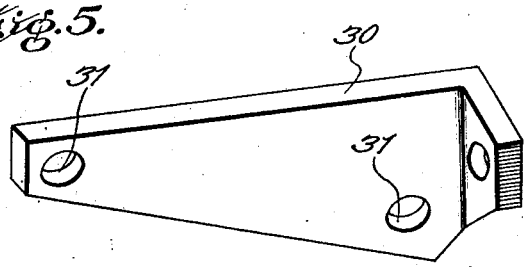

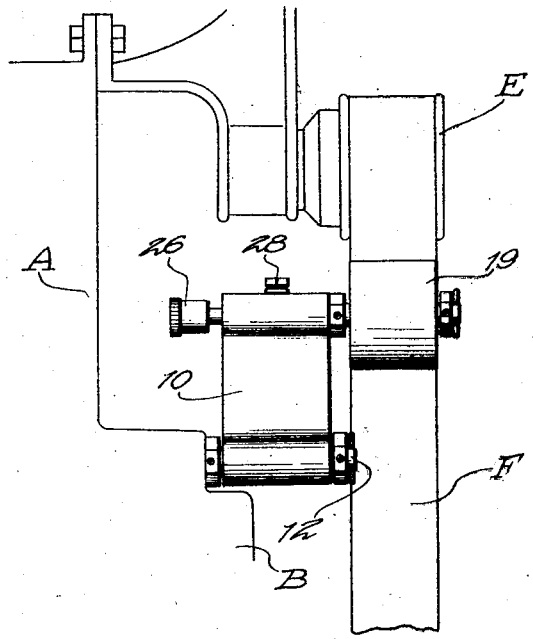
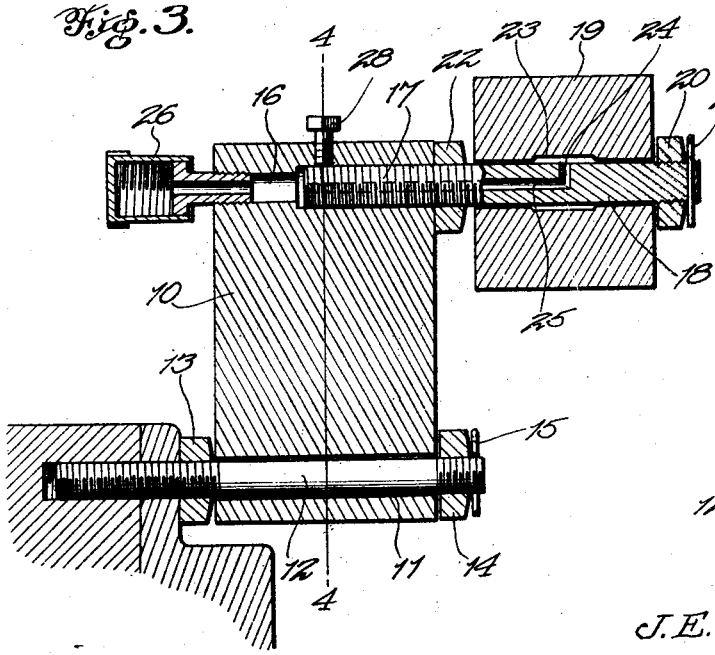
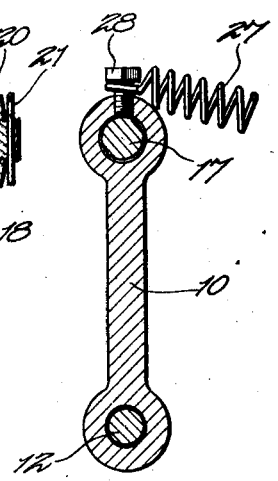

1,551,442

UNITED STATES PATENT OFFICE

JOSEPH E. TOOMBS, OF CAIRO, MISSOURI.

BELT TIGHTENER.

Application filed May 12, 1924. Serial No. 712,757.

*To all whom it may concern:*

Be it known that I, JOSEPH E. TOOMBS, a citizen of the United States, residing at Cairo, in the county of Randolph and State of Missouri, have invented new and useful Improvements in Belt Tighteners, of which the following is a specification.

This invention relates to attachments to or accessories for the engines of tractors and the like and has for its object the provision of a novel device adapted to be mounted on the front plate of the engine for engaging and holding the fan belt tightly so that slipping thereof upon its pulleys will be prevented, the device being designed specially for use on a Fordson tractor though not limited to this particular make.

It is well known that the fan belt of an automobile or tractor engine soon stretches and becomes loose, a condition which permits slipping of the belt upon the pulleys. Quite naturally such slipping will reduce the speed of the fan and the result is that the engine is not kept as cool as it should be owing to the reduced circulation of air through the radiator.

It is with the above facts in view that I have designed the present invention which has for a more specific object the provision of a spring pressed roller supported by an arm mounted on the engine and bearing against the belt for applying proper tension thereto to take up any looseness.

Another object is the provision of an attachment of this character which will be simple and inexpensive to manufacture, which may be put out as a complete and separate entity ready for application to an already existing motor, which will be positive in action, efficient and durable in service and a general improvement in the art.

With the above and other objects and advantages in view the invention consists in the details of construction to be hereinafter more fully described and claimed and illustrated in the accompanying drawings, in which:

Figure 1 is a front elevation of an engine with my device applied, the fan being removed, Figure 2 is a side elevation, Figure 3 is a longitudinal section through the attachment, Figure 4 is a section on the line 4—4 of Figure 3, Figure 5 is a detail perspective view of the attaching bracket for the spring.

Referring more particularly to the drawings the letter A designates a portion of an internal combustion engine such as used on Fordsons, B represents the front plate thereof, C the crank shaft and D the pulley shaft which carries a pulley E driven by a belt F trained about a pulley G on the crank shaft. All this structure is old and well known. It is likewise understood in the art that the front plate B is held to the engine by studs H.

In carrying out my invention I provide a bracket arm 10 formed near one end with a hole 11 through which is passed a threaded stud 12 which replaces one of the studs H and which serves as a pivot for the arm 10. On the stud 12 is a nut 13 arranged between the arm and the engine front plate, and on the outer extremity of the stud is a clamping nut 14 held against displacement by a cotter pin 15 or the like.

The other end of the bracket arm 10 is formed with a bore 16 into which is screwed the threaded end 17 of a spindle 18 on which is journaled a roller 19 which is preferably of substantially the same width as the fan belt F and which bears thereagainst. The roller is held against displacement by a nut 20 threaded onto the spindle and engaged by a cotter pin 21 or the like. It might also be mentioned that a nut 22 is provided on the spindle between the arm 10 and the roller for adjusting and locking purposes.

To effect lubrication of the roller 19 it is formed centrally with a pocket 23 into which leads the laterally extending branch 24 of a lubricant passage 25 formed through the spindle 18 and leading into the bore 16. Screwed into this bore is a conventional oil or grease cup 26 adapted to be filled with lubricant which will work through the passage 25 into the pocket 23 for lubricating the spindle and roller.

The arm 10 is formed on the engine end plate B in such position that the roller 19 will bear against the fan belt. To provide tension holding this roller in place I make use of a coil spring 27 which has one end secured to a set screw 28 threaded into the arm 10 and which has its other end connected with an eye bolt 29 carried by an angular bracket 30 which is formed with holes 31 for the passage of two of the studs H at the other side of the fan belt. The eye bolt carries a pair of nuts 32 by means of which adjustment may be made for varying the spring tension.

In action it is obvious that the spring 27 will always hold the arm 10 in such rocked position that the roller 19 will bear firmly against the belt F and take up any slackness therein caused by stretching from any reason.

While I have shown and described the preferred embodiment of my invention it is of course to be understood that I reserve the right to make such changes in the form, construction and arrangement of parts as will not depart from the spirit of the invention or the scope of the subjoined claim.

I claim:

A belt tightener attachment for internal combustion engines, comprising an arm having one end apertured and adapted for the passage of one of the studs provided for securing the front plate to the engine whereby said studs will act to pivotally mount the arm, a spindle provided with lubricating means and extending through the other end of the arm, a roller journally mounted on said spindle and normally engaging against the fan belt of the engine, an angular bracket member disposable against the front plate of the engine and apertured for the passage of certain of the studs provided for holding the end plate in place, said bracket member having a laterally extended end provided with a hole, an eye bolt engaged through said hole and carrying adjusting nuts, and a coil spring connected with the eye bolt and connected with said arm whereby to urge the roller resiliently into engagement with the belt.

In testimony whereof I affix my signature.

JOSEPH E. TOOMBS.